United States Patent
Kim et al.

(10) Patent No.: US 10,659,644 B2
(45) Date of Patent: May 19, 2020

(54) IMAGE FORMING DEVICE FOR EXECUTING SCREEN SAVER, AND METHOD FOR CONTROLLING IMAGE FORMING DEVICE FOR EXECUTING SCREEN SAVER

(71) Applicant: Hewlett-Packard Development Company, L.P., Spring, TX (US)

(72) Inventors: Jung-hoon Kim, Suwon-si (KR); In-Cheon Park, Suwon-si (KR); Hyuck Kim, Suwon-si (KR); Soo-Young Kang, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/503,801

(22) Filed: Jul. 5, 2019

(65) Prior Publication Data

US 2019/0335052 A1   Oct. 31, 2019

Related U.S. Application Data

(63) Continuation of application No. PCT/KR2017/007007, filed on Jul. 3, 2017.

(30) Foreign Application Priority Data

Jan. 13, 2017  (KR) .......................... 10-2017-0006284

(51) Int. Cl.
*H04N 1/00* (2006.01)
*H04N 1/32* (2006.01)

(52) U.S. Cl.
CPC ..... *H04N 1/00896* (2013.01); *H04N 1/00477* (2013.01); *H04N 1/00501* (2013.01); *H04N 1/32512* (2013.01); *H04N 2201/0046* (2013.01)

(58) Field of Classification Search
CPC .......... H04N 1/00896; H04N 1/00477; H04N 1/00501; H04N 1/32512; H04N 2201/0046; H04N 1/00; G06F 1/32; G06F 3/12; Y02D 10/159
See application file for complete search history.

(56) References Cited

U.S. PATENT DOCUMENTS

2004/0051752 A1*  3/2004  Asauchi ............... B41J 2/17513
                                                                347/19
2006/0015827 A1*  1/2006  Ferguson ............... G06Q 30/02
                                                                715/867
2009/0172607 A1   7/2009  Dai et al.

FOREIGN PATENT DOCUMENTS

KR    10-2002-0093751 A    12/2002
KR    10-2006-0004816 A     1/2006
KR       10-0651689 B1     12/2006

* cited by examiner

*Primary Examiner* — Neil R McLean
(74) *Attorney, Agent, or Firm* — Jefferson IP Law, LLP

(57) ABSTRACT

An image forming apparatus that executes a screen saver that provides information related with an accessory device connected to the image forming apparatus, and a method of controlling the image forming apparatus that executes a screen saver are provided. The method includes sensing an accessory device connected to the image forming apparatus, requesting execution of a screen saver corresponding to the sensed accessory device, searching for the screen saver corresponding to the sensed accessory device, and executing a found screen saver.

20 Claims, 13 Drawing Sheets

IMAGE FORMING DEVICE FOR EXECUTING SCREEN SAVER, AND METHOD FOR CONTROLLING IMAGE FORMING DEVICE FOR EXECUTING SCREEN SAVER

BACKGROUND

Screen savers have been developed to prevent a burn-in phenomenon of display devices and are used when an apparatus is not used for a certain time. A user may directly set an image that is to be used as a screen saver, for each apparatus, and a display device may execute a screen saver when a power save event occurs.

DESCRIPTION OF EXAMPLES

Various examples now will be described more fully hereinafter with reference to the accompanying drawings. The examples described hereinafter may be modified in many different forms.

Throughout the specification, when an element is referred to as being "connected" or "coupled" to another element, it can be directly connected or coupled to the other element or can be connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

While such terms as "first," "second," etc., may be used to describe various components, such components must not be limited to the above terms. The above terms are used only to distinguish one component from another.

In the specification, an "image forming job" may denote any one of various jobs (e.g., printing, copying, scanning, or faxing) related to an image, such as forming of an image or generating/storing/transmitting of an image file, and a "job" may denote not only an image forming job, but may also denote a series of processes required to perform the image forming job.

An "image forming apparatus" may denote any apparatus capable of performing an image forming job, such as a printer, a copier, a scanner, a fax machine, a multi-function printer (MFP), or a display apparatus.

A "hard copy" may denote an operation of printing an image on a print medium, such as paper, and a "soft copy" may denote an operation of printing an image on a display device, such as a television (TV) or a monitor, or storing image data in a memory.

"Content" may denote any type of data that is a target of an image forming job, such as a picture, an image, a document file, or the like.

"Print data" may denote data having a format printable by a printer.

A "scan file" may denote a file generated by scanning an image by using a scanner.

A "user" may denote a person who performs a manipulation related to an image forming job by using an image forming apparatus or a device connected to the image forming apparatus in a wireless or wired manner. A "manager" may denote a person who has authority to access all functions and a system of an image forming apparatus. A "manager" and a "user" may be the same person.

The below examples relate to an image forming apparatus that executes a screen saver, and a method of controlling the image forming apparatus that executes a screen saver.

Figure 1:
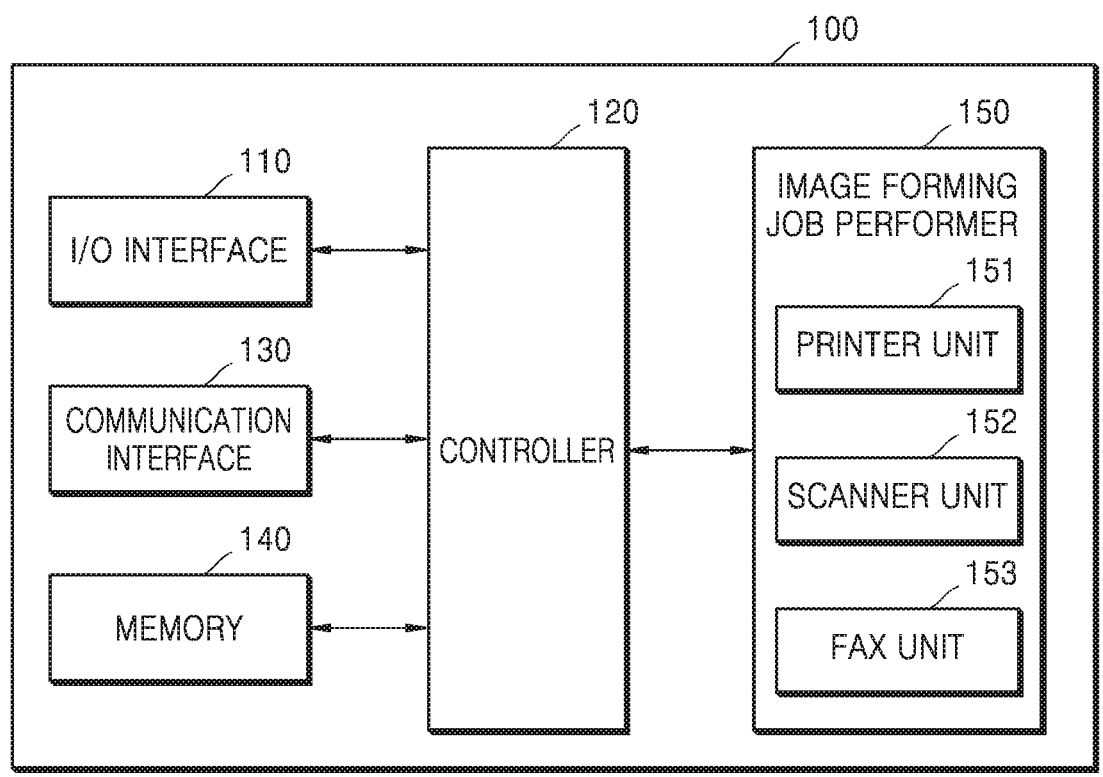
FIG. 1 is a block diagram of an image forming apparatus according to an example.

FIG. 1 is a block diagram of an image forming apparatus according to an example.

Referring to FIG. 1, an image forming apparatus 100 may include an input/output (I/O) interface 110, a controller 120, a communication interface 130, a memory 140, and an image forming job performer 150. Although not shown in FIG. 1, the image forming apparatus 100 may further include a power supply to supply power to each component of the image forming apparatus 100.

The I/O interface 110 may include an input interface for receiving, from a user, an input for performing an image forming job, and an output interface for displaying information, such as a result of performing an image forming job or a state of the image forming apparatus 100. For example, the I/O interface 110 may include an operation panel to receive a user input and a display panel to display a screen image.

As an example, the input interface may include at least one device capable of receiving various types of user inputs, such as a keyboard, a physical button, a touch screen, a camera, a microphone, or the like. The output interface may include, for example, a display panel, a speaker, or the like. However, examples are not limited thereto and the I/O interface 110 may include a device that supports various inputs and outputs.

The controller 120 may control an operation of the image forming apparatus 100 and may include at least one processor, such as a central processing unit (CPU). The controller 120 may control other components included in the image forming apparatus 100 such that an operation corresponding to a user input received via the I/O interface 110 is performed. The controller 120 may include at least one specialized processor corresponding to each function or may be an integrated processor.

For example, the controller 120 may execute a program stored in the memory 140, read data or a file stored in the memory 140, store a new file in the memory 140, or the like.

The communication interface 130 may perform wired/wireless communication with another device or a network. To this end, the communication interface 130 may include a communication module (e.g., transceiver) that supports at least one of various wired and wireless communication methods. For example, the communication module may be in the form of a chipset, or may be a sticker or barcode (e.g., a sticker including a near field communication (NFC) tag) including information necessary for communication.

The wireless communication may include, for example, at least one of wireless fidelity (WiFi), WiFi Direct, Bluetooth, ultra-wide band (UWB), NFC, or the like. The wired communication may include at least one of a universal serial bus (USB), a high definition multimedia interface (HDMI), or the like.

The communication interface 130 may be connected to an apparatus external to the image forming apparatus 100 to transmit or receive a signal or data to or from the external apparatus. In an example, the image forming apparatus 100 is connected to a user terminal via the communication interface 130. The communication interface 130 may transmit a signal or data received from the user terminal to the controller 120, or transmit a signal or data generated by the controller 120 to the user terminal. For example, when the communication interface 130 receives a print command signal or print data from the user terminal, the controller 120 may output the received print data through a printer unit 151.

Figure 2:
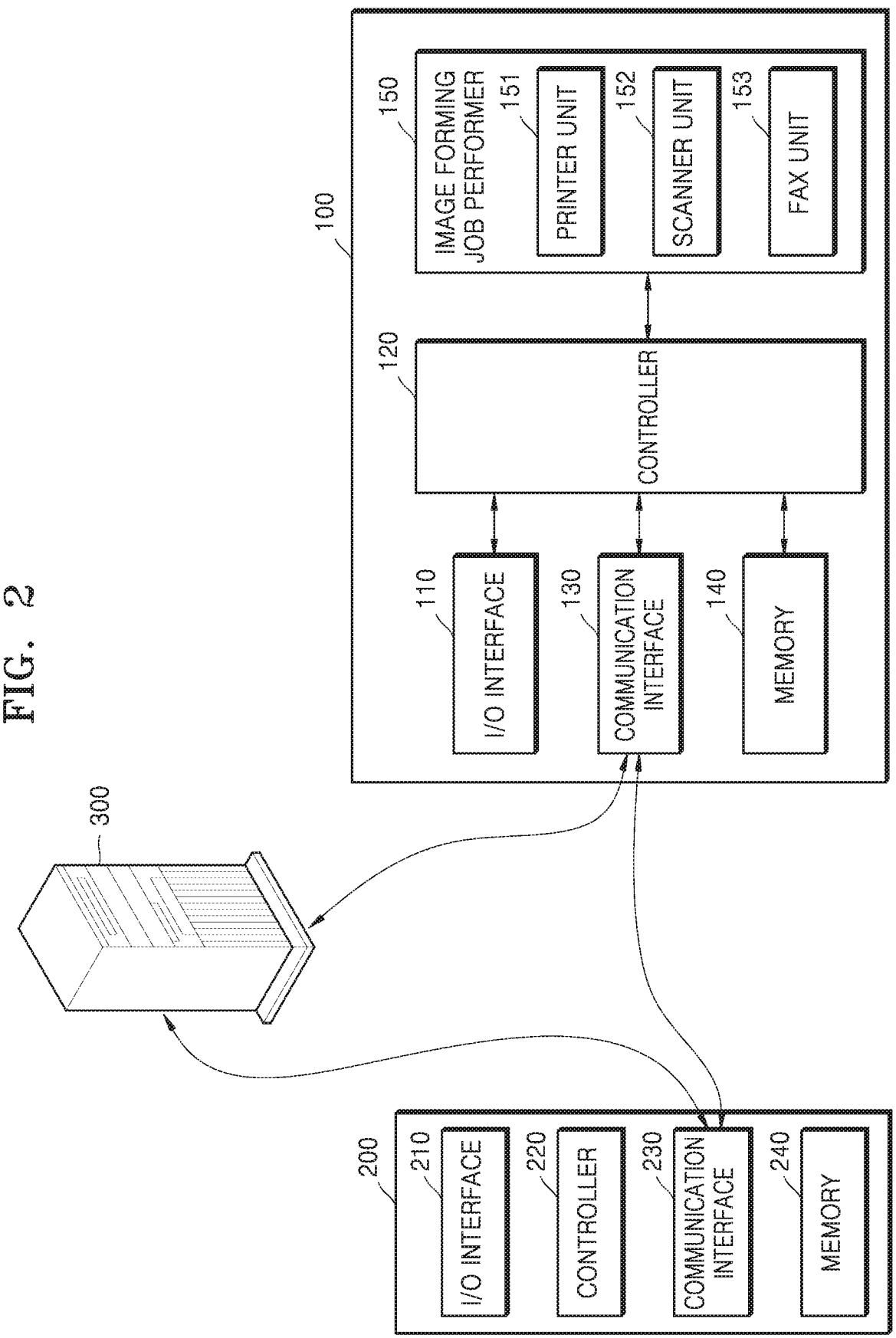
FIG. 2 is a diagram showing an environment in which an image forming apparatus is connected to a user terminal or a server according to an example.

FIG. 2 is a diagram showing an environment in which an image forming apparatus is connected to a user terminal or a server according to an example.

Referring to FIG. 2, a user terminal 200 may include an I/O interface 210, a controller 220, a communication interface 230, and a memory 240. The controller 220 may control an image forming job by executing a program stored in the memory 240 and transmitting a signal or data generated as a result of executing the program to the image forming apparatus 100 through the communication interface 230. The user terminal 200 may include, for example, a smartphone, a tablet, a personal computer (PC), a home appliance, a camera, a wearable device, or the like.

The communication interface 130 may be connected to a server 300 to transmit and receive a signal or data to and from the server 300. The communication interface 130 may be connected to the user terminal 200 via the server 300. In other words, the communication interface 130 of the image forming apparatus 100 may transmit and receive a signal or data to and from the communication interface 230 of the user terminal 200 via the server 300.

Referring again to FIG. 1, various types of data, such as a file and a program like an application, may be installed and stored in the memory 140. The controller 120 may access and use data stored in the memory 140 or may store new data in the memory 140. The controller 120 may execute the program installed in the memory 140. The controller 120 may install, in the memory 140, an application received from an external source through the communication interface 130.

The image forming job performer 150 may perform an image forming job, such as printing, copying, scanning, or faxing.

As illustrated in FIG. 1, the image forming job performer 150 may include the printer unit 151, a scanner unit 152, and a fax unit 153, but as occasion demands, the image forming job performer 150 may include some of them or may further include a component for performing another type of image forming job.

The printer unit 151 may form an image on a recording medium via any one of various printing methods, such as an electrophotography method, an inkjet method, a thermal transfer method, a thermal method, or the like.

The scanner unit 152 may radiate light onto a document and receive light reflected from the document to read an image recorded on the document. Examples of an image sensor for reading an image from a document may include a charge-coupled device (CCD) and a contact type image sensor (CIS). The scanner unit 152 may have a flatbed structure in which a document is located at a fixed location and an image sensor moves to read an image, a document feed structure in which an image sensor is located at a fixed location and a document is transferred, or a combination structure thereof.

The fax unit 153 may share a component for scanning an image with the scanner unit 152, share a component for printing a received file with the printer unit 151, transmit a scan file to a destination, receive a file from an external source, or the like.

The names of the components of the image forming apparatus 100 may change. The image forming apparatus 100 may include at least one of the aforementioned components, some of the aforementioned components may be omitted, or other components may be further included in addition to the aforementioned components.

The I/O interface 110 may include an independent control system. In other words, the I/O interface 110 may include a control system (e.g., a controller and a memory) for controlling a user interface (UI) provided by the I/O interface 110, separate from the controller 120 of the image forming apparatus 100. An operating system (OS) for providing a UI, and programs, such as an application for supporting various functions, may be installed in the control system of the I/O interface 110.

Figure 3:
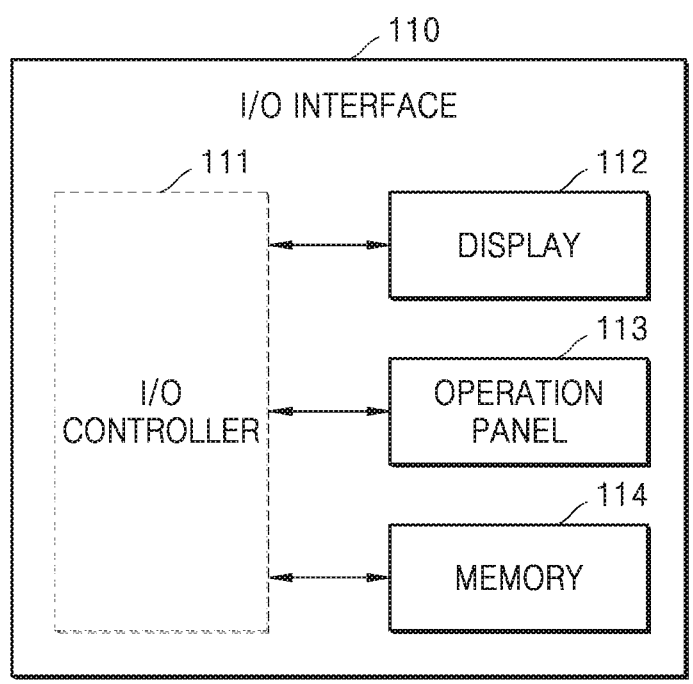
FIG. 3 is a block diagram of an input/output (I/O) interface according to an example.

FIG. 3 is a block diagram of an I/O interface according to an example.

Referring to FIG. 3, the I/O interface 110 may include an I/O controller 111, a display 112, an operation panel 113, and a memory 114.

The I/O interface 110 may include an independent control system (e.g., the I/O controller 111 and the memory 114) that is separate from the controller 120. The I/O controller 111 and the memory 114 may control a UI that is provided by the I/O interface 110. Similar to the controller 120, the I/O controller 111 may be implemented using a processor, such as a CPU. In an example, the I/O interface 110 may not include the I/O controller 111 and the controller 120 of the image forming apparatus 100 may provide the operations or functions of the I/O controller 111.

The display 112 may be implemented using a liquid crystal display (LCD) panel, a light-emitting diode (LED) panel, an organic LED (OLED) panel, or the like, and the operation panel 113 may be implemented using a physical button, a touch screen, or the like.

The I/O interface 110 may be detachable from the image forming apparatus 100. For example, the I/O interface 110 may operate similar to a tablet when being separated from the image forming apparatus 100 and may perform an I/O function when in communication with the image forming apparatus 100. In the case that the I/O interface 110 is separable, the I/O interface 110 may further include a communication interface for performing communication with an external apparatus.

The above-described examples may be embodied in the form of a non-transitory computer-readable recording medium for storing computer executable instructions and data. At least one of the instructions and data may be stored in the form of program code and, when executed by a processor, may perform a certain operation by generating a certain program module.

The computer-readable recording medium may refer to a magnetic storage medium (e.g., a hard disk) and an optical recording medium (e.g., a CD or a DVD), and may refer to a memory included in a server accessible via a network. For example, the computer-readable recording medium may be one of the memory 140 of the image forming apparatus 100 and the memory 114 of the I/O interface 110, or may be the memory 240 included in the user terminal 200 connected to the image forming apparatus 100 via a network.

The I/O interface 110 may execute a screen saver to prevent a burn-in phenomenon from occurring when a screen of the display 112 is maintained for a certain time. Examples of the present disclosure of executing a screen saver that provides information related with an accessory device 500 connected to the image forming apparatus 100 will now be described.

Figure 4:
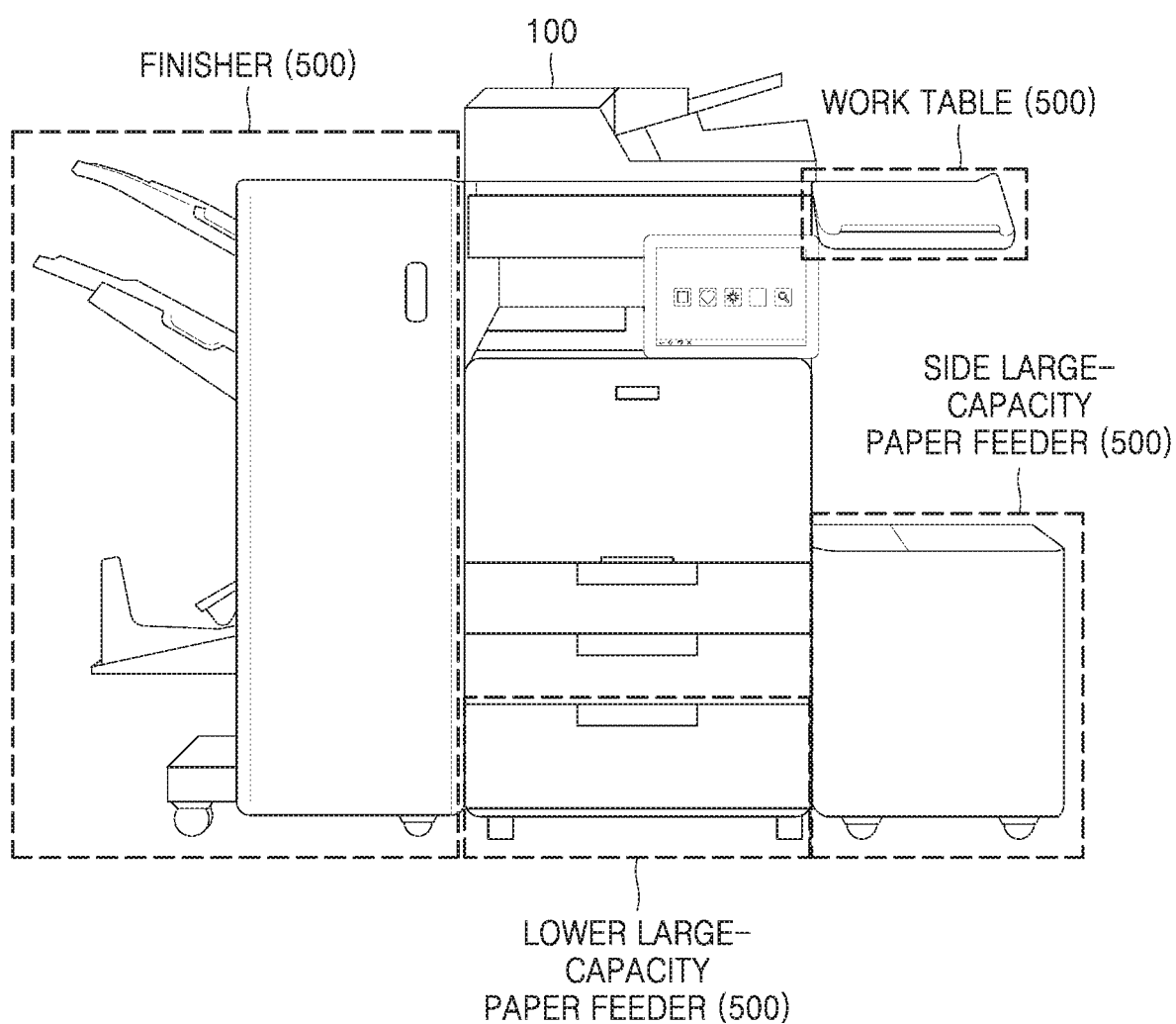
FIG. 4 illustrates accessory devices connected to an image forming apparatus according to an example.

FIG. 4 illustrates accessory devices that are connected to the image forming apparatus according to an example.

Referring to FIG. 4, an accessory device 500 is a general term for any device that is connected to the image forming apparatus 100 to improve or supplement a function of the image forming apparatus 100 or expand the function of the image forming apparatus 100 to thereby increase user convenience. The accessory device 500 may be a device that is externally connected to the image forming apparatus 100 or a device that is internally connected to the image forming apparatus 100.

For example, the accessory device 500 may be a finisher, a paper feeder, a work table, a job sorting table, a fax kit, an external device interface kit, a network kit, a tray locking kit, a foreign device interface (FDI), or the like. The finisher may be of any of various types, such as an embedded finisher, a large-capacity finisher, a booklet finisher, or the like. The paper feeder may be of any of various types, such as a two-speed paper feeder, a lower large-capacity paper feeder, a side large-capacity paper feeder, or the like. The network kit may be a wireless network kit, a Bluetooth low energy (BLE) kit, an NFC kit, or the like. The FDI may be used as a billing device that guides a user of the image forming apparatus 100 to pay costs due to a function and to use the image forming apparatus 100.

In the example of FIG. 4, a finisher, a work table, a lower large-capacity paper feeder, and a side large-capacity paper feeder may be connected as accessory devices 500 to the image forming apparatus 100.

Figure 5:
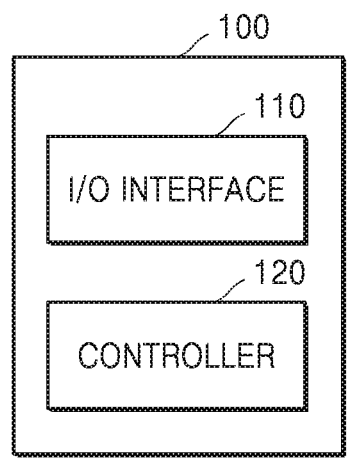
FIG. 5 is a block diagram of an image forming apparatus that executes a screen saver according to an example.

FIG. 5 is a block diagram of an image forming apparatus that executes a screen saver according to an example.

Referring to FIG. 5, the image forming apparatus 100 includes the I/O interface 110 and the controller 120.

The controller 120 may sense an accessory device 500 connected to the image forming apparatus 100 and may request execution of a screen saver corresponding to the sensed accessory device 500. When an accessory device 500 is connected to the image forming apparatus 100, the controller 120 may sense the accessory device 500, and, when an event of requesting execution of a screen saver occurs in the image forming apparatus 100, the controller 120 may sense the accessory device 500. A request for execution of a screen saver corresponding to a sensed accessory device 500 may be implemented by various methods. For example, the controller 120 may request the I/O interface 110 to execute a screen saver corresponding to the sensed accessory device 500 by transmitting a type or identifier of the sensed accessory device 500 to the I/O interface 110. When any of a screen image is kept for a certain period of time or longer because there are no external input, a user of the image forming apparatus 100 is logged out, or the image forming apparatus 100 is switched to a power save mode, the controller 120 may request the I/O interface 110 to execute a screen saver.

The I/O interface 110 may search for a screen saver corresponding to the sensed accessory device 500 and may execute a found screen saver. The content of a screen saver may vary according to the type of an accessory device 500 connected to the image forming apparatus 100 and may be a method of using an accessory device 500 connected to the image forming apparatus 100. For example, the content of a screen saver may be a method of executing or manipulating an accessory device 500 connected to an image forming apparatus or an instruction method for a user associated with the accessory device 500.

When a plurality of accessory devices 500 are connected to the image forming apparatus 100, the I/O interface 110 may sequentially execute screen savers respectively corresponding to the plurality of accessory devices 500 in a certain order. For example, when a priority is previously set for each accessory device 500, the I/O interface 110 may sequentially execute the screen savers respectively corresponding to the accessory devices 500 connected to the image forming apparatus 100 according to the preset priorities of the connected accessory devices 500.

The I/O interface 110 may map information about content of a screen saver of an accessory device 500 with each accessory device 500 and store a result of the mapping in advance in the memory 114. The I/O interface 110 may search for the screen saver corresponding to the sensed accessory device 500 based on the information about the items of content of the screen savers stored in advance in the memory 114. The information about the content of a screen saver may be information about a location where the content of the screen saver is stored.

The screen saver executed by the I/O interface 110 may be released according to a request of the accessory device 500 or an input of a user of the image forming apparatus 100.

Figure 6:
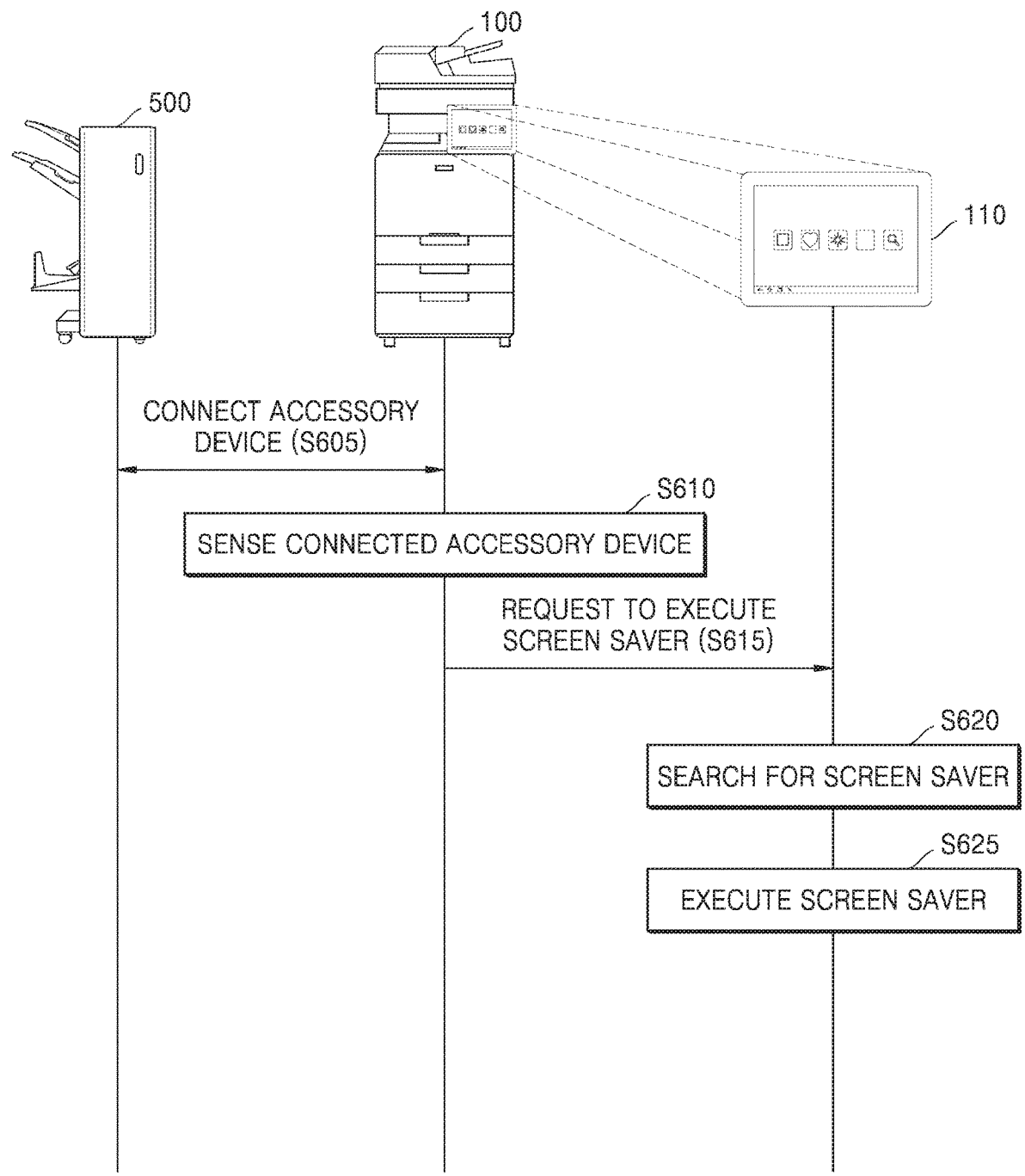
FIG. 6 is a flowchart of operations when an image forming apparatus is connected to an accessory device according to an example.

FIG. 6 is a flowchart of operations when an image forming apparatus is connected to an accessory device according to an example.

Referring to FIG. 6, the image forming apparatus 100 may be connected to at least one accessory device 500 in operation S605. The image forming apparatus 100 may be electronically connected to or mechanically combined with the at least one accessory device 500.

In operation S610, the controller 120 of the image forming apparatus 100 may sense the connected accessory device 500. As an example, the controller 120 of the image forming apparatus 100 may determine a type or identifier of the connected accessory device 500.

In operation S615, the controller 120 of the image forming apparatus 100 may request the I/O interface 110 of the image forming apparatus 100 to execute a screen saver corresponding to the sensed accessory device 500. For example, the controller 120 of the image forming apparatus 100 may request the I/O interface 110 of the image forming apparatus 100 to execute the screen saver corresponding to the sensed accessory device 500 by transmitting the type or identifier of the connected accessory device 500 to the I/O interface 110 of the image forming apparatus 100.

In operation S620, the I/O interface 110 of the image forming apparatus 100 may search for the screen saver corresponding to the accessory device 500 sensed by the image forming apparatus 100. The I/O interface 110 of the image forming apparatus 100 may search for information about content of the screen saver corresponding to the accessory device 500 by using the received type or identifier of the accessory device 500.

To this end, the I/O interface 110 of the image forming apparatus 100 may store, in the memory 114, information about content of a screen saver corresponding to each accessory device 500 in advance, the information being mapped with each accessory device 500. The I/O interface 110 of the image forming apparatus 100 may search for the screen saver corresponding to the sensed accessory device 500 based on the information about the content of the screen saver. The information about the content of the screen saver may be information about a location where the content of the screen saver is stored.

Figure 7:
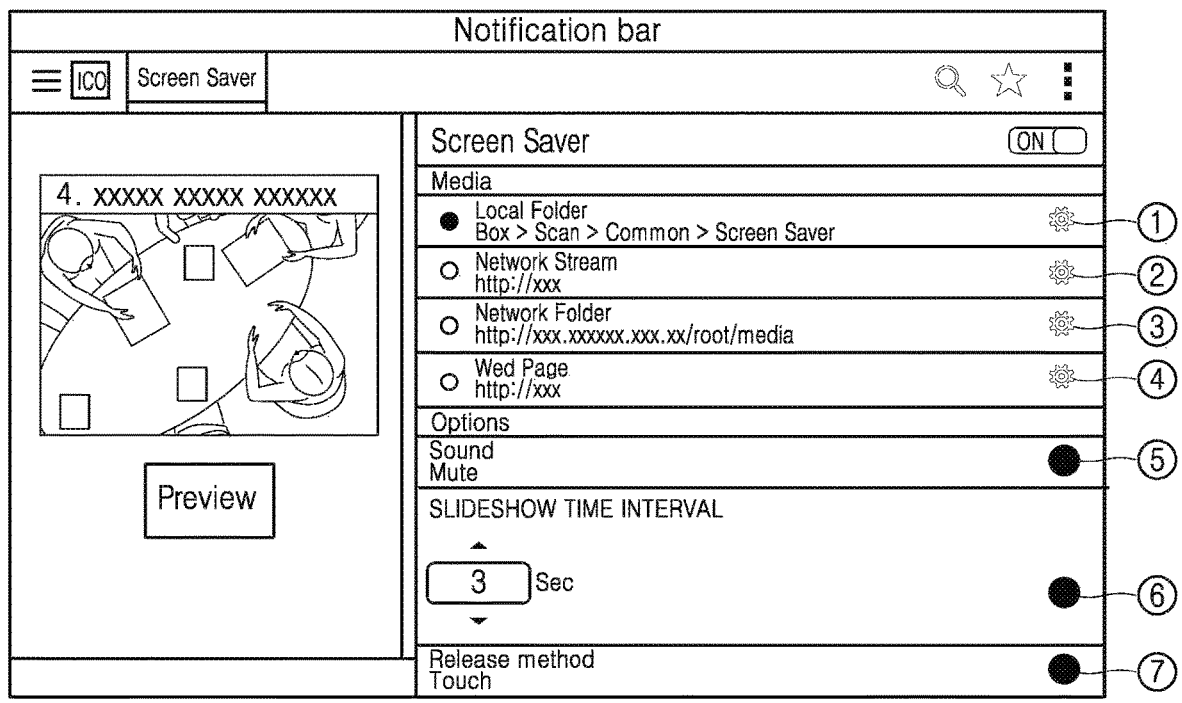
FIG. 7 illustrates an execution screen image of an application for setting a screen saver according to an example.

FIG. 7 illustrates an execution screen image of an application for setting a screen saver according to an example.

Referring to FIG. 7, when an application for setting a screen saver, which is provided in the I/O interface 110 of the image forming apparatus 100, is executed, a UI window may be displayed on the I/O interface 110.

As shown in FIG. 7, a screen saver may be stored in a local memory inside the image forming apparatus 100 or may be stored outside the image forming apparatus 100. Information about content of the screen saver may be a server address outside the image forming apparatus 100 at which the content of the screen saver is stored. A user may select a location of the local memory as a location where the content of the screen saver is to be stored in advance. To this end, a path setting window ① may be selected to set a location of the local memory where the content of the screen saver exists. In an example, the user may set an address of a network stream (e.g., a cloud storage) as the location where the content of the screen saver is to be stored in advance. To this end, a path setting window ② may be selected to set an address of a network stream where the content of the screen saver exists. The user may set a location of a network memory as the location where the content of the screen saver is to be stored in advance. To this end, a path setting window ③ may be selected to set a location of the network memory where the content of the screen saver exists. The user may set a web page address as the location where the content of the screen saver is to be stored in advance. To this end, a path setting window ④ may be selected to set a web page address where the content of the screen saver exists.

When a preview button is selected after the location of the content of the screen saver is determined, the content of the screen saver may be reproduced on a preview area such that a preview is performed.

When a sound item ⑤ is selected, the volume of the sound may be controlled when the screen saver is executed.

In a slideshow time interval item ⑥, a time interval at which each slide is displayed on a screen when a slideshow is conducted may be set.

In a release method item ⑦, a method of releasing the screen saver may be set. When the I/O interface 110 is selected by the user or is pressed for a threshold duration, the screen saver may be set to be released.

Referring again to FIG. 6, in operation S625, the I/O interface 110 of the image forming apparatus 100 may execute a found screen saver. The I/O interface 110 of the image forming apparatus 100 may execute the screen saver corresponding to the accessory device 500 connected to the image forming apparatus 100 by accessing a location where the content of the screen saver is stored. The screen saver may be an image and a moving picture of various formats. The I/O interface 110 of the image forming apparatus 100 may execute the screen saver by downloading the content of the screen saver or by streaming the content of the screen saver from the location where the content of the screen saver is stored.

Figure 8:
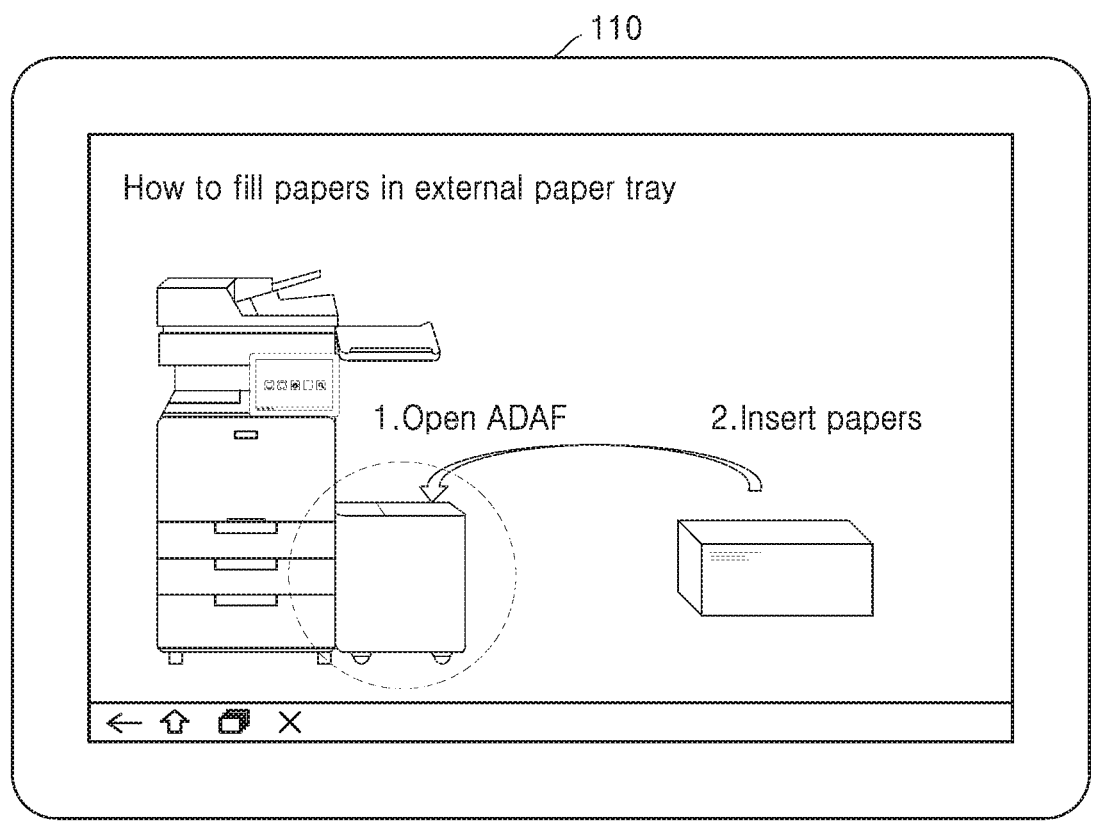
FIGS. 8 through 10 illustrate a screen saver corresponding to an accessory device according to various examples.
Figure 9:
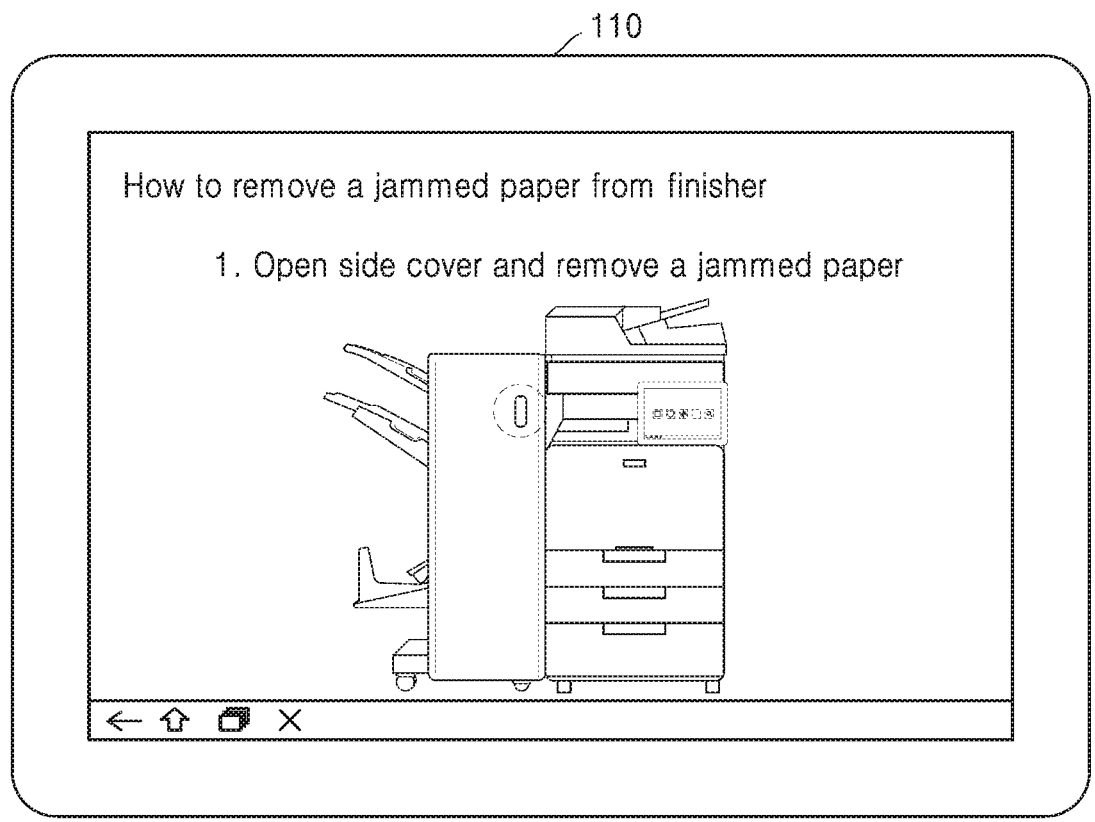
Figure 10:
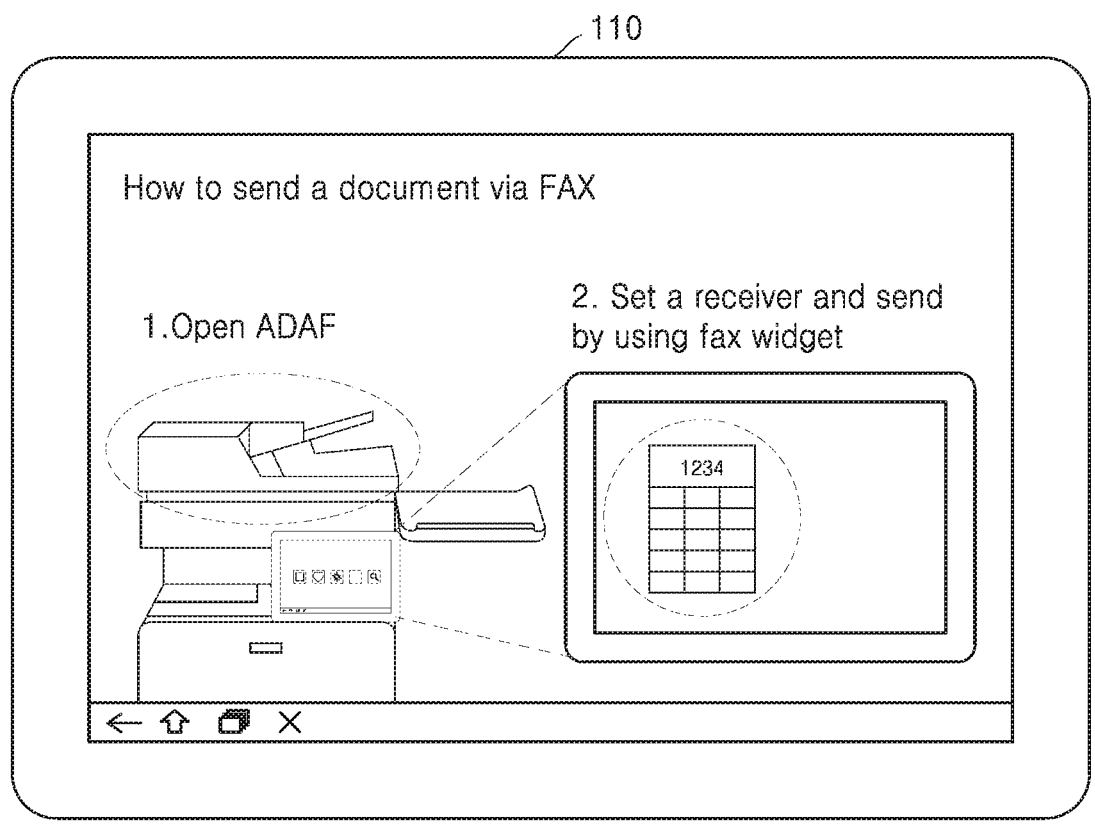

FIGS. 8 through 10 illustrate a screen saver corresponding to an accessory device according to various examples.

Referring to FIG. 8, when an accessory device 500 connected to the image forming apparatus 100 is a paper feeder, the I/O interface 110 of the image forming apparatus 100 may execute a screen saver that explains a method of filling the paper feeder with sheets of paper.

Referring to FIG. 9, when the accessory device 500 connected to the image forming apparatus 100 is a finisher, the I/O interface 110 of the image forming apparatus 100 may execute a screen saver that explains a method of removing a jammed paper sheet from the finisher.

Referring to FIG. 10, when the accessory device 500 connected to the image forming apparatus 100 is a fax kit, the I/O interface 110 of the image forming apparatus 100 may execute a screen saver that explains a method of sending a document via faxing.

Figure 11:
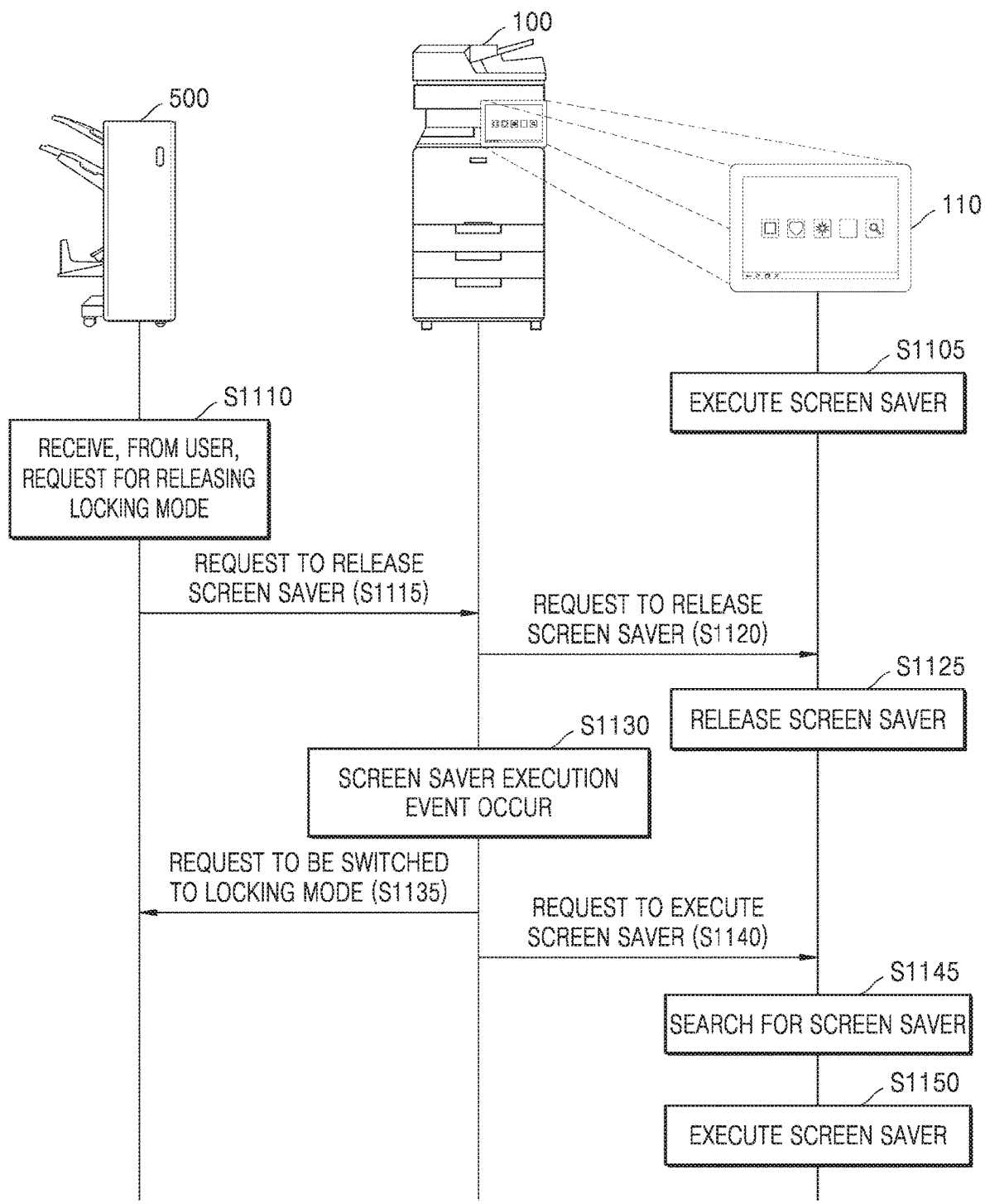
FIG. 11 is a flowchart of operations when an image forming apparatus is connected to an accessory device according to an example.

FIG. 11 is a flowchart of operations when an image forming apparatus is connected to an accessory device according to an example.

Referring to FIG. 11, the I/O interface 110 of the image forming apparatus 100 is executing a screen saver in operation S1105. Content of the screen saver may be a procedure for releasing a locking mode of the accessory device 500 connected to the image forming apparatus 100.

Figure 12:
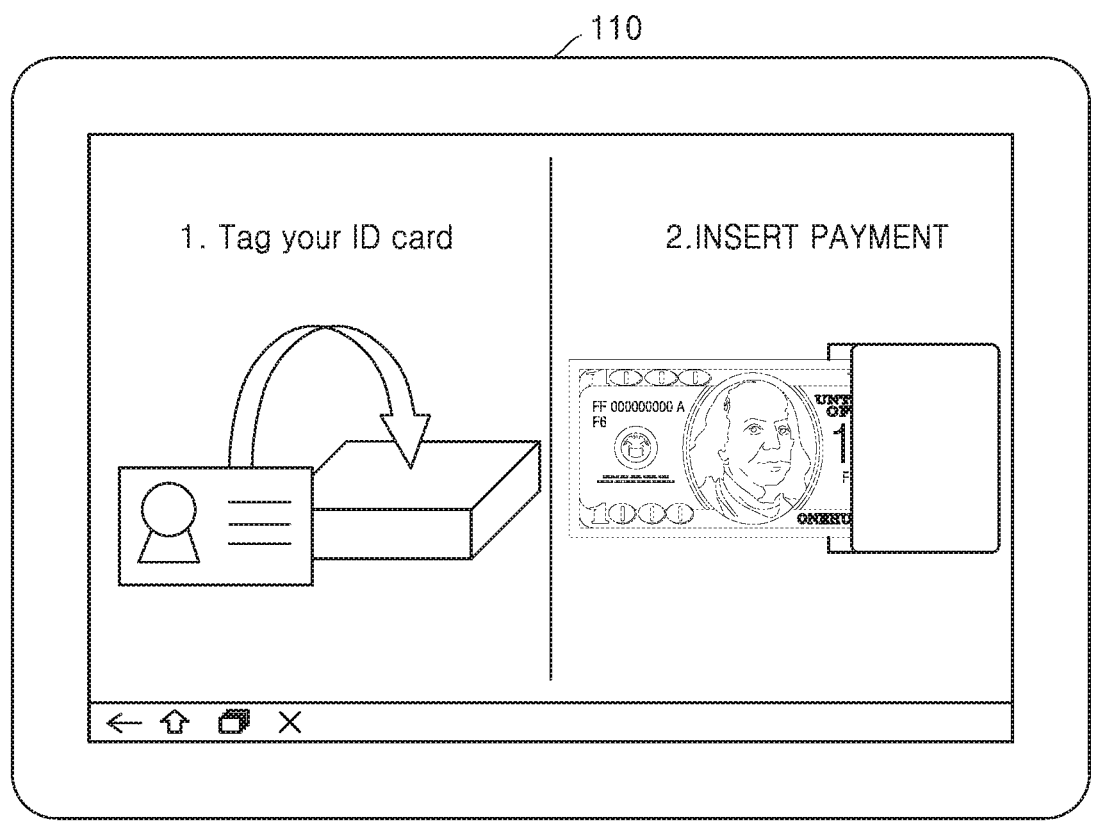
FIG. 12 illustrates a screen saver that provides a procedure for releasing a locking mode of an accessory device according to an example.

FIG. 12 illustrates a screen saver that provides a procedure for releasing a locking mode of an accessory device according to an example.

Referring to FIG. 12, to release a locking mode of an accessory device 500 connected to the image forming apparatus 100, a procedure instructing to tag an ID card and insert payment is provided in the form of a screen saver.

A user may check the procedure for releasing the locking mode of the accessory device 500, which has been provided as a screen saver, and may take actions for releasing the locking mode of the accessory device 500.

Referring again to FIG. 11, in operation S1110, the accessory device 500 may receive, from the user, a request for releasing a locking mode. The user may request the accessory device 500 to release the locking mode of the accessory device 500 by performing the procedure for releasing the locking mode of the accessory device 500 according to the content of the screen saver provided by the I/O interface 110 of the image forming apparatus 100.

In operation S1115, the accessory device 500 may request the image forming apparatus 100 to release the screen saver.

In operation S1120, the controller 120 of the image forming apparatus 100 may request the I/O interface 110 of the image forming apparatus 100 to release the screen saver, in response to the screen saver releasing request from the accessory device 500.

In operation S1125, the I/O interface 110 of the image forming apparatus 100 may release the screen saver in response to the screen saver releasing request. After the locking mode of the accessory device 500 is released, the image forming apparatus 100 may receive a command for releasing the screen saver.

In operation S1130, after execution of the screen saver is released and the user uses the image forming apparatus 100, a screen saver execution event may occur in the image forming apparatus 100. For example, when any of a screen image is kept for a certain period of time or longer without an external input, a user of the image forming apparatus 100 is logged out, or the image forming apparatus 100 is switched to a power save mode, the screen saver executing event may occur.

In operation S1135, when an event for requesting execution of a screen saver is generated in the image forming apparatus 100, the controller 120 of the image forming apparatus 100 may request the accessory device 500 to be switched to a locking mode.

In operation S1140, the controller 120 of the image forming apparatus 100 may request the I/O interface 110 of the image forming apparatus 100 to execute the screen saver corresponding to the connected accessory device 500. For example, the controller 120 of the image forming apparatus 100 may request the I/O interface 110 of the image forming apparatus 100 to execute the screen saver corresponding to the connected accessory devices 500 by transmitting a type or identifier of the connected accessory device 500 to the I/O interface 110 of the image forming apparatus 100.

In operation S1145, the I/O interface 110 of the image forming apparatus 100 may search for the screen saver corresponding to the accessory device 500. The I/O interface 110 of the image forming apparatus 100 may search for information about content of the screen saver corresponding to the accessory device 500 by using the received type or identifier of the accessory device 500. The I/O interface 110 of the image forming apparatus 100 may search for the screen saver corresponding to the connected accessory device 500 based on the information about the content of the screen saver.

In operation S1150, the I/O interface 110 of the image forming apparatus 100 may execute a found screen saver. The I/O interface 110 of the image forming apparatus 100 may execute the screen saver corresponding to the accessory device 500 connected to the image forming apparatus 100 by accessing a location where the content of the screen saver is stored.

Figure 13:
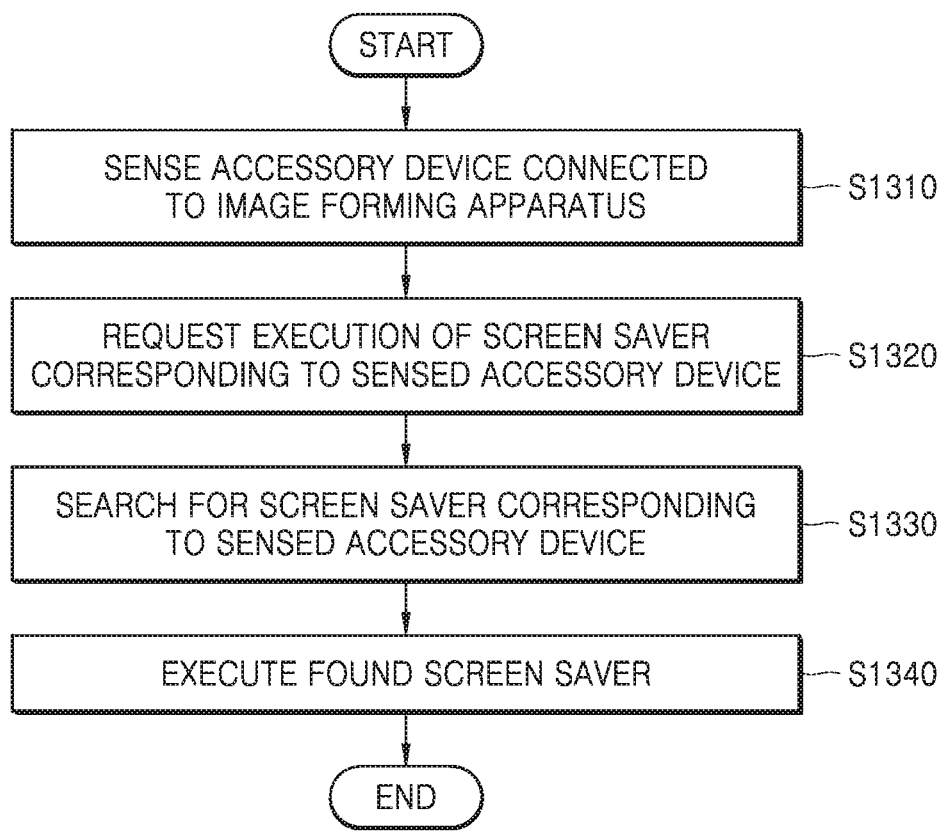
FIG. 13 is a flowchart of a method of controlling an image forming apparatus that executes a screen saver according to an example.

FIG. 13 is a flowchart of a method of controlling an image forming apparatus that executes a screen saver according to an example.

Referring to FIG. 13, the image forming apparatus 100 may sense an accessory device 500 connected to the image forming apparatus 100 in operation S1310.

In operation S1320, the image forming apparatus 100 may request execution of a screen saver corresponding to the sensed accessory device 500. When any of a screen image is kept for a certain period of time or longer without an external input, a user of the image forming apparatus 100 is logged out, or the image forming apparatus 100 is switched to a power save mode, the image forming apparatus 100 may request execution of the screen saver.

In operation S1330, the image forming apparatus 100 may search for the screen saver corresponding to the sensed accessory device 500. To this end, the image forming apparatus 100 may store, in the memory 114, information about content of a screen saver corresponding to each accessory device 500 in advance, the information being mapped with each accessory device 500. The image forming apparatus 100 may search for the screen saver corresponding to the sensed accessory device 500, based on the information about the content of the screen saver previously-stored in the memory 114.

In operation S1340, the image forming apparatus 100 may execute a found screen saver. Content of a screen saver may vary according to the type of an accessory device 500 connected to the image forming apparatus 100. The content of a screen saver may be a method of using an accessory device 500 connected to the image forming apparatus 100. When a plurality of accessory devices 500 are connected to the image forming apparatus 100, the image forming apparatus 100 may sequentially execute screen savers respectively corresponding to the plurality of accessory devices 500 in a certain order.

The above-described method of controlling an image forming apparatus that executes a screen saver can be written as a computer program and can be implemented in general-use digital computers that execute the program using a non-transitory computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

Examples have been described above. It will be understood by those of ordinary skill in the art that various changes in form and details may be made to the described examples without departing from the characteristics of the above descriptions. It should be understood that the above examples should be considered in a descriptive sense only and not for purposes of limitation. Therefore, the scope of the disclosure is defined not by the above-described examples but by the appended claims, and any difference within the scope will be construed as being included in the disclosure.

What is claimed is:

1. An image forming apparatus comprising:
a controller to sense an accessory device connected to the image forming apparatus and request execution of a screen saver corresponding to the sensed accessory device; and
an input/output (I/O) interface to search for a screen saver corresponding to the sensed accessory device and execute a found screen saver.

2. The image forming apparatus of claim 1, wherein content of the screen saver varies according to a type of the accessory device connected to the image forming apparatus.

3. The image forming apparatus of claim 1, wherein content of the screen saver includes a method of using the accessory device connected to the image forming apparatus.

4. The image forming apparatus of claim 1, wherein, when one of a screen image is kept for a certain period of time or longer without an external input, a user of the image forming apparatus is logged out, or the image forming apparatus is switched to a power save mode, the controller requests execution of the screen saver.

5. The image forming apparatus of claim 1, wherein, when a plurality of accessory devices are connected to the image forming apparatus, the I/O interface sequentially executes screen savers respectively corresponding to the plurality of accessory devices in a certain order.

6. The image forming apparatus of claim 5, wherein, when a priority is previously set for each of the plurality of accessory devices, the I/O interface sequentially executes the screen savers respectively corresponding to the plurality of accessory devices according to the preset priorities.

7. The image forming apparatus of claim 1, wherein the I/O interface maps information about content of the screen saver corresponding to the accessory device with the accessory device and stores a result of the mapping in advance in a memory, and searches for the screen saver corresponding to the sensed accessory device based on the information about the content of the screen saver stored in advance in the memory.

8. The image forming apparatus of claim 7, wherein the information about the content of the screen saver may be an address of a server external to the image forming apparatus at which the content of the screen saver is stored.

9. The image forming apparatus of claim 7, wherein the information about the content of the screen saver includes information about a location where the content of the screen saver is stored.

10. The image forming apparatus of claim 1,
wherein content of the screen saver includes a procedure for releasing a locking mode of the accessory device connected to the image forming apparatus, and
wherein, when the locking mode of the accessory device is released, the controller is requested by the accessory device to release execution of the screen saver and the I/O interface releases the executed screen saver.

11. The image forming apparatus of claim 10, wherein, when an event for requesting execution of the screen saver occurs in the image forming apparatus, the controller requests the accessory device to be switched to the locking mode.

12. The image forming apparatus of claim 1, wherein the executed screen saver is released according to a request of the accessory device or an input of a user of the image forming apparatus.

13. The image forming apparatus of claim 1, wherein the controller requests execution of the screen saver corresponding to the sensed accessory device by transmitting a type or an identifier of the sensed accessory device to the I/O interface.

14. The image forming apparatus of claim 13, wherein the I/O interface is to search for the screen saver corresponding to the sensed accessory device using the type or the identifier of the sensed accessory device.

15. A method of controlling an image forming apparatus, the method comprising:
sensing an accessory device connected to the image forming apparatus;
requesting execution of a screen saver corresponding to the sensed accessory device;
searching for the screen saver corresponding to the sensed accessory device; and
executing a found screen saver.

16. The method of claim 15, wherein content of the screen saver varies according to a type of the accessory device connected to the image forming apparatus.

17. The method of claim 15, wherein content of the screen saver includes a method of using the accessory device connected to the image forming apparatus.

18. The method of claim 15, wherein when one of a screen image is kept for a certain period of time or longer without an external input, a user of the image forming apparatus is logged out, or the image forming apparatus is switched to a power save mode, the execution of the screen saver is requested.

19. The method of claim 15, further comprising:
mapping information about content of the screen saver corresponding to the accessory device with the accessory device, the information including a location where the content of the screen saver is stored;
storing a result of the mapping in advance in a memory;
selecting a preview button after the result of the mapping is stored; and
reproducing the content of the screen saver on a preview area.

20. A non-transitory computer-readable recording medium having recorded thereon a computer program for controlling an image forming apparatus, the non-transitory computer-readable recording medium comprising:
instructions to sense an accessory device connected to the image forming apparatus;
instructions to request execution of a screen saver corresponding to the sensed accessory device;
instructions to search for the screen saver corresponding to the sensed accessory device; and
instructions to execute a found screen saver.

* * * * *